March 9, 1948.  F. K. FLOYD  2,437,639
ELECTRICAL MEASURING APPARATUS
Filed Aug. 19, 1943   2 Sheets-Sheet 1

Inventor:
Frederick Kessler Floyd,

By Pierce + Scheffler,
Attorneys.

March 9, 1948.　　　　F. K. FLOYD　　　　2,437,639
ELECTRICAL MEASURING APPARATUS
Filed Aug. 19, 1943　　　　2 Sheets-Sheet 2
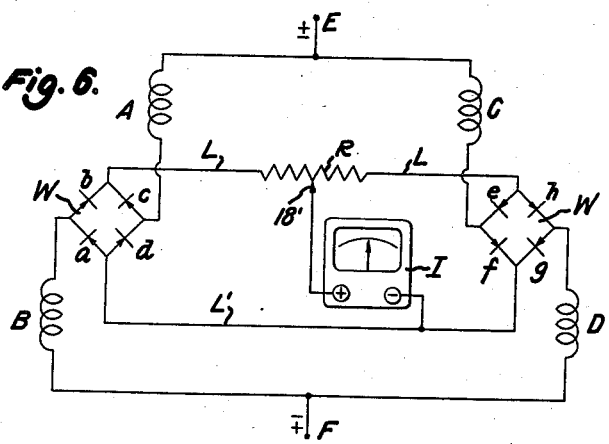
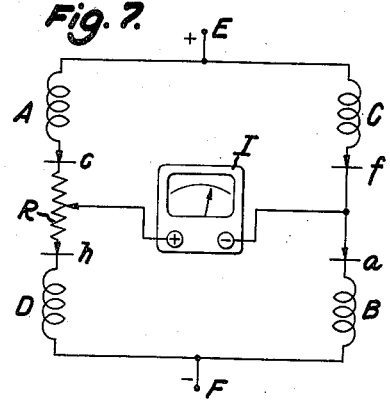 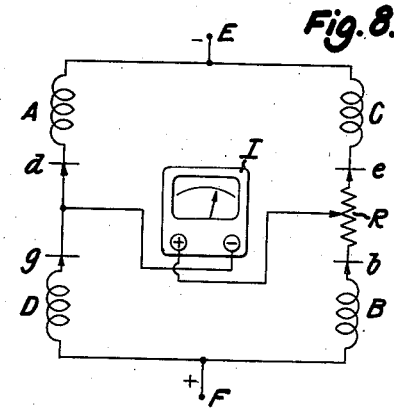
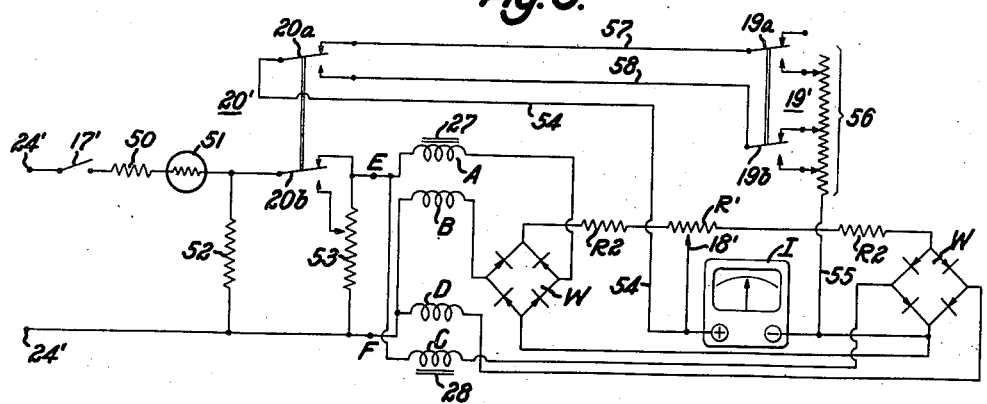
Inventor:
Frederick Kessler Floyd,
By Pierce + Scheffler,
Attorneys.

Patented Mar. 9, 1948

2,437,639

UNITED STATES PATENT OFFICE 2,437,639

ELECTRICAL MEASURING APPARATUS

Frederick Kessler Floyd, Denver, Colo., assignor to Metron Instrument Company, Denver, Colo., a corporation of Colorado Application August 19, 1943, Serial No. 499,282

12 Claims. (Cl. 33—147)

This invention relates to electrical measuring apparatus including alternating current networks for the measurement or the comparison of impedances, and more particularly to novel mechanical constructions of comparator gages in which Wheatstone bridge circuits are incorporated.

An object of the invention is to provide electrical measuring apparatus for the measurement or comparison of alternating current impedances, the apparatus including an alternating current bridge and a direct current measuring circuit incorporated directly within the bridge. An object is to provide comparator gages of improved mechanical construction that adapt the gage to the inspection of manufactured parts of various shapes and that reduce eye fatigue when a large number of parts are to be inspected. An object is to provide a comparator gage that is adjustable for the inspection of parts or different dimensions, the gage having a plurality of elements for setting the indicator rapidly at zero reading at a desired standard dimension. A further object is to provide a comparator gage of the electrical type which includes an adjustable spring device for regulating the pressure of the gage spindle upon the parts that are to be inspected.

These and other objects and advantages of the invention will be apparent from the following specification when taken with the accompanying drawings in which:

Fig. 6 is a circuit diagram of the electrical measuring network;

Figs. 7 and 8 are equivalent circuit diagrams illustrating the respective paths of current flow during alternate half-cycles; and Fig. 9 is a wiring diagram of the apparatus illustrated in Figs. 1 to 5.

Figure 1:
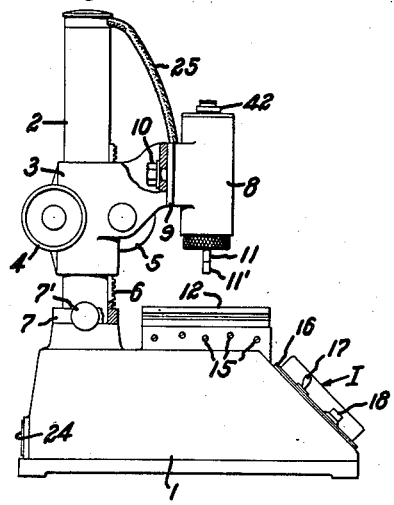
Fig. 1 is a side elevation of multirange electrical measuring apparatus embodying the invention.
Figure 2:
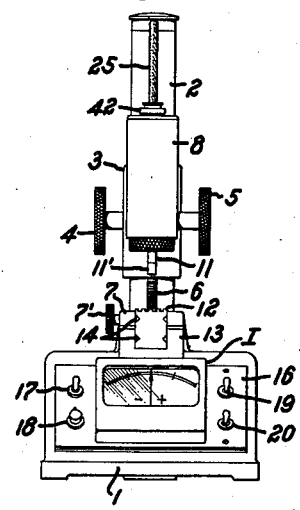
Figs. 2 and 3 are front elevations of the apparatus showing different adjustments of the gage head and column.

The illustrated apparatus is a portable self-contained unit with all mechanical and electrical parts supported on or within the rugged base 1 that may be set upon a work bench or table. The vertical column 2 is rigidly secured to the base 1 to provide a support for the split collar or bracket 3 which carries the gage head. The bracket 3 may be adjusted angularly about and axially of the column, and then clamped in desired position by a hand wheel 4. Axial adjustment is effected by a hand wheel 5 and a gear, not shown, in mesh with a rack 6 carried by a collar 7, the collar being adjustable angularly about the column 2 and clamped thereto by a thumb screw 7'. A gage head 8 of generally cylindrical form has a rearward extension to which a flat mounting plate 9 is secured for engaging a similar flat surface on the bracket 3, the gage head being adjustable angularly upon and clamped to the bracket by bolt or stud 10. A gage spindle 11 is supported for axial movement in the gage head and has a removable spindle tip 11' for engaging the manufactured parts or test pieces that are placed on an anvil 12 that is adjustably mounted between heavy ribs 13 of the base 1. The anvil has V-shaped grooves 14 in its opposite edges and a plurality of pointed set screws 15 extend through the ribs 13 to seat in the grooves, the several set screws of each rib being staggered vertically for a slight angular adjustment or leveling of the anvil 12. Different types or shapes of anvils and/or fixtures may be mounted on the base, and the illustrated anvil is reversible and provided with work-supporting surfaces of different character, i. e. a plane surface and a ribbed surface.

A panel 16 is mounted on the inclined forward surface of the base 1, and carries a direct current instrument I, an "on-off" switch 17, and the knob 18 of a zero-setting resistor in the electrical network. The measuring instrument is a "zero-center" milliammeter for the direct indication of dimensional variations in either sense from the selected standard dimension and, in the illustrated embodiment, the instrument scale was 4" long and marked with 40 equal divisions of 0.1 inch each, see Fig. 4. Scale markings of "2-0-2" and "4-0-4" appear above and below the graduated arc, and toggle switches 19, 20 are mounted on the panel 16 to control the measuring range. The legends "Top scale" and "Bottom scale" are engraved on panel 16 adjacent switch 19 to indicate the value of the end scale graduations ("2" or "4") as determined by the position of the switch 19. Similarly, legends "Ten thousandths" and "Thousandths" are engraved on panel 16 adjacent switch 20 to indicate the multiplier to be employed, in accordance with the adjustment of the switch, to convert the end scale reading ("2" or "4") to an absolute value in inches. The measuring ranges depend, of course, upon the constants of the circuit network and the values shown on the instrument scale plate and the panel in Fig. 4 are to be understood as applying only to a particular embodiment of the invention.

Figure 4:
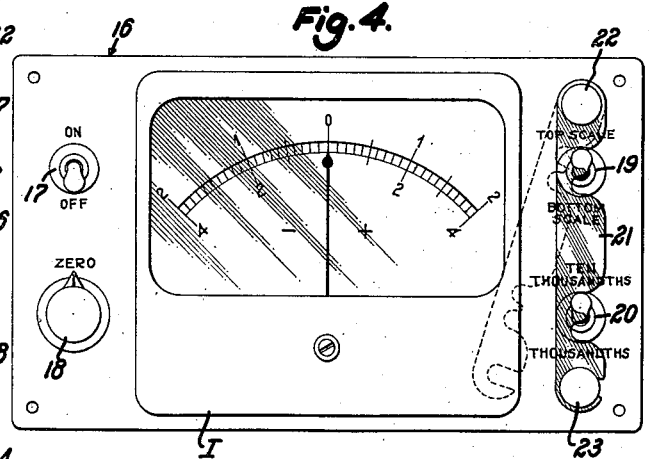
Fig. 4 is an enlarged plan view of the control panel and instrument.

The range-changing switches may be, and preferably are, of the toggle type and are locked against inadvertent displacement by a notched latch plate 21 that is secured to the panel by thumb screws 22, 23, see Fig. 4. The plate may be swung out of switch locking position by loosening the lower screw 23, or it may be removed by loosening lower thumb screw 23 and removing the upper thumb screw 22. The latch plate is preferably formed of a transparent plastic when, as shown, the panel carries legends adjacent switches 19, 20 to indicate the measuring ranges that are selected by adjustments of the switches.

The apparatus is preferably designed to operate from the available light and power source, for example from 105-125 volts, 60 cycles circuits, and the base 1 is provided with a receptacle 24 into which a power cable may be plugged. The electrical cable connection 25 to the gage head extends through the column 2 and includes a plug and receptacle, not shown, that permits removal of the gage head from the base.

Figure 3:
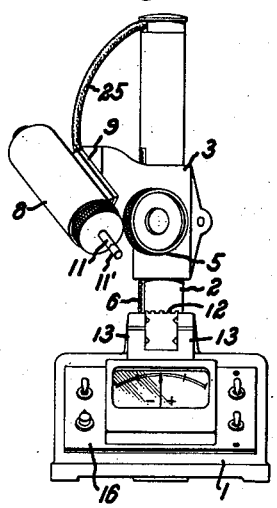
Figure 5:
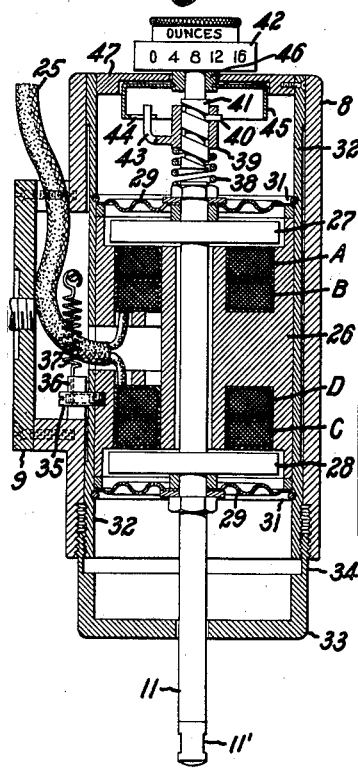
Fig. 5 is a substantially central section of the gage head.

The bracket 3 and associated rack 6 may be adjusted angularly about the axis of the column 2, and the gage head 8 may be adjusted angularly about the axis of the clamping stud 10, to facilitate the inspection of parts of irregular shape or design. A typical adjustment is shown in Fig. 3 to indicate the adaptability of the the apparatus to special work. Particular attention is directed to the fact that the tip 11' of the gage spindle 11 and the scale plate of the instrument I are displaced angularly only a slight distance and that they are substantially equidistant from the operator's eyes when the gage is located, as is customary, on a work bench or table. This reduces eye strain and fatigue to a minimum as the operator does not look in substantially different directions and does not focus alternately at different distances in looking at the spindle tip and at the instrument.

A magnetic core 26 is supported within the cylindrical gage head 8, the core being counterbored from its ends to provide recesses in which four coils A—D, preferably of identical design and characteristics, are seated. The gage spindle 11 extends axially through the central bore of the core 26 and carries magnetic armatures 27, 28 that extend over coils A, B and beneath coils C, D, respectively. The spindle 11 is "floated" for displacement axially of the gage head by flexible diaphragms 29 that have their central portions secured to the spindle 11 and their rim portions secured to the core 26 by split spring rings 31 that seat within grooves cut into the inner wall of a cylindrical sleeve 32. The entire spindle-core-sleeve assembly is adjustable axially within the shell 8 by the end cap 33 which has a flange 34 with external and internal threads of slightly different pitch for engagement with the lower threaded ends of the shell 8 and sleeve 32, respectively. These differential threads provide a "vernier" or fine mechanical adjustment for accurately setting the gage tip 11' in contact with a standard block after a coarse adjustment of the gage tip position by moving the entire gage head and bracket 3 along the column 2.

A guide screw 35 is threaded into the sleeve 32 and core 26 to restrict their joint movement to an axial sliding within the shell 8, the screw 35 being positioned within a pair of ears 36. A pair of springs 37 are connected between the shell 8 and sleeve 32 to urge the core-sleeve assembly upwardly, thereby eliminating backlash by maintaining the assembly at the greatest elevation permitted by the adjustment of the end cap 33.

A coil spring 38 urges the spindle downwardly with a pressure that is determined by the axial adjustment of an upper spring seat or hollow cam-follower 39 that has a pin 40 seated in the helical slot of a cam 41 on the shaft of a pressure-adjusting head 42. Indexing means, not shown, may be provided to retain the head 42 yieldingly at any adjusted position. The spring seat is held against rotation by a laterally arranged arm 43 that slides in a hole or radial slot in the inturned ear 44 at the lower edge of an inverted cup-shaped member 45 carried by the bushing 46 in which the cam shaft is journalled. The bushing is mounted in the upper cap 47 of the sleeve 32, and the adjusting head 42 is secured to the shaft by a set screw or other means, not shown.

The strength of the spring 38 and the pitch of the cam slot may be so related as to provide any desired range of operating pressures for measurements on materials ranging from paper to diamonds by eliminating errors caused by material deformation or by oil films. The drawings illustrate a particular embodiment in which the pressure was adjustable between about 2 and 32 ounces.

The impedance measuring circuit is of a modified Wheatstone bridge type and may be visualized, as illustrated in Fig. 6, as comprising the inductances A, B and C, D in parallel paths between the alternating current input terminals E, F, the inductances A, B and C, D being connected to oppositely disposed terminals of respective rectifier bridges W, leads L, L' connecting the other pair of oppositely disposed rectifier bridge terminals, and a direct current measuring instrument I connected between the leads L, L'. A potentiometer R is included in the lead L, the tap 18' of potentiometer R being in the instrument circuit and adjustable by the knob 18 for setting the instrument reading to zero without affecting the balance or relative values of the impedances A—D. The bridge impedances are inductive in the illustrated comparator gage but it will be apparent that they may be capacitive, resistive or of mixed character in other embodiments of the electrical measuring apparatus.

The elements $a$—$d$ and $e$—$h$ of the rectifier bridges W are of the metallic or electronic type, with the polarities of the rectifiers of each bridge arranged to provide two paths in parallel between the terminals to which leads L, L' of the direct current instrument circuit are connected. The impedances of the alternating current bridge are connected to the midpoints of the parallel paths through the rectifier bridges W.

The true bridge nature of the network will be apparent from an inspection of Figs. 7 and 8 that illustrate only those elements that carry current during alternate half-waves when the potential at terminal E or at terminal F, respectively, is positive. The impedances A and B are varied in the same sense by an adjustment of the armature 27, and impedances C and D are varied together by the armature 28 and in a sense opposite that of the change in the magnitudes of the impedances A, B. The paths of current flow during alternate half-cycles will not be recited in detail as they may be traced on the drawings. It is to be noted that the direct current measuring instrument I is located within the alternating current bridge network and not, as in prior measuring circuits of this general type, in a rectifier bridge in an alternating current output circuit of the main bridge network. A direct current is established through the instrument I when the alternating current bridge is unbalanced, and the polarity of the direct current is the same for both half-cycles of the alternating current input at any given bridge balance condition. The magnitude and the polarity of the direct current vary with the degree and sense in which the bridge is unbalanced. The zero position of the instrument pointer is at the center of the scale, and the pointer deflection indicates both the sense and the magnitude of the unbalance of the alternating current bridge without supplementary biasing or current bucking methods.

The complete circuit of a multirange comparator gage is shown in Fig. 9. The power input terminals 24' are supported by the socket 24, Fig. 1, and the power switch 17' corresponds to the physical switch 17 of Fig. 4. A voltage-dropping resistor 50 and ballast tube 51 are in series in one side of the line to limit the maximum voltage applied to the bridge network, for example to about 30 volts, and a resistor 52 is shunted across the line to bring the total current within the rating of the ballast tube. The input terminals E, F of the measuring network will be connected to the opposite ends of resistor 52 when the gage is to have a single measuring range but the illustrated circuit includes range-changing elements that are located in part in the input circuit and, in part, in the direct current measuring circuit. The alternating current network is electrically identical with that previously described but the resistance in the lead L takes the form of a small potentiometer R' in series with fixed resistors R2.

The switches 19, 20 of Fig. 4 are identified in the circuit diagram by numerals 19', 20', and are of the double pole, double throw type with blades 19a, 19b and 20a, 20b, respectively. Switch 19' controls the measuring range by adjusting the circuit network for a reading of the pointer position along either the upper or the lower scales of the milliammeter I and switch 20' effects a 10-to-1 adjustment of the measuring ranges as selected by the scale selecting switch 19'. The blade 20b of switch 20' is connected to the ballast resistor 51, the back contact is connected to the input terminal E of the impedance bridge, and the front contact is connected to a tap on resistor 53 that is shunted across the input terminals E, F. The alternating current voltage impressed upon the measuring network is thus reduced when the switch 20' is adjusted from its "Ten thousandths" position to the lower sensitivity "Thousandths" position. The remaining elements of the range selecting system are located in a switch and resistance network that is shunted across the milliammeter I. Lead 54 extends from one instrument terminal to the blade 20a of the range selecting switch 20', and lead 55 extends from the other terminal to a series of resistors, indicated generally by reference numeral 56, that preferably comprise a number of fixed resistors and potentiometers. The back contact of switch blade 19a of switch 19' is open, and the front contact and both contacts of blade 19b are connected to taps that are adjustable along the resistor 56 for calibration. The back and front contacts of the switch blade 20a are connected to the switch blades 19a, 19b by leads 57, 58, respectively.

The switches are illustrated in positions corresponding to maximum measuring sensitivity, i. e. switch 19' is adjusted to "Top scale" position and switch 20' is adjusted to "Ten thousandths" position. The alternating current voltage at the network terminals E, F is relatively high as blade 20b connects the ballast resistor 51 directly to the input terminal E when the "Ten thousandths" measuring sensitivity is desired.

Switch blade 20a rests on its back contact to connect blade 19a of switch 19' to the shunt resistance network of the milliammeter I. The shunt circuit is open, however, as the back contact of blade 19a is not connected to the resistance network, and the entire direct current is through the milliammeter. The measuring range of the spindle tip 11' is ±0.0002 inch at this adjustment of the electrical network. A shift of the switch 19' to its alternative "Bottom scale" position closes the blade 19a on its front contact, thereby shunting the entire effective portion of resistor 56 across the milliammeter I. A part of the direct current is by-passed around the milliammeter at this switch adjustment, and a displacement of the pointer to an end of the upper scale corresponds to a movement of the spindle tip 11' through ±0.0004 inch.

Reversing the position of switch 20' to its "Thousandths" position reduces the alternating current input voltages by connecting a part of resistor 53 in series with input terminal E and by shunting the other part across the input terminals. This reduction of voltage prevents vibration of the spindle 11 and armatures 27, 28 when the wider travel of the gage spindle at this scale range brings the armatures close to the coil pole pieces. The tendency toward vibration is particularly noticeable at low spindle pressures. The blade 19b will be effective at this "Thousandths" adjustment of switch 20', and it controls the instrument shunt circuit to connect a relatively large or a smaller part of the resistor 56 across the instrument for measurements in the "Top" or "Bottom" scale ranges. These adjustments of the electrical network correspond to measuring ranges of the spindle tip 11' of ±0.002 and ±0.004 inch respectively.

The apparatus is conditioned for gaging operations by placing a standard size work piece, or a gage block of accurately ascertained dimensions, on the anvil 12, loosening clamp wheel 4, and turning wheel 5 to move the bracket 3 axially of column 2 to set the spindle tip 11' in contact, or substantially in contact, with the standard work piece or gage block. The clamp wheel 4 is then tightened and the end cap 33 of the gage head is rotated to set the instrument pointer at approximately its zero central position. The differentially threaded cap 33 provides a vernier mechanical adjustment of the gage tip 11', and the final adjustment of the pointer position is effected by turning the knob 18 to adjust the tap 18' along the resistor r'. A frictional drag is imposed upon the knob 18 to preclude accidental displacement from the final zero-setting adjustment.

Other work pieces may then be tested by placing them on the anvil 12 and beneath the gage tip 11' and, if they are not of exactly the same size as the selected standard work piece, the error is indicated directly by the reading of the instrument I. The displacement of the instrument pointer is a substantially linear magnification of the spindle tip displacement, and this linear response is characteristic of the particular bridge network that is shown in Fig. 6. Direct current measuring instruments have been employed to indicate the balance condition of alternating current bridges but the prior alternating current bridges had an alternating current output that was rectified in a direct current measuring circuit external to the bridge. The direct current measuring circuit of this invention is within the alternating current bridge, and this arrangement has proved more satisfactory than the prior systems.

It is to be understood that the invention is not limited to the particular apparatus and circuits here shown and described, and that various modifications that may occur to those skilled in the art fall within the spirit of my invention as set forth in the following claims.

I claim:

1. In a comparator gage, a gage head, a sleeve slidable within said gage head, a spindle, flexible diaphragms supporting said spindle within said sleeve, and manually adjustable means carried by said sleeve for impressing an adjustable pressure upon and axially of said spindle.

2. In a comparator gage, a gage head comprising a shell, a core within said shell, a spindle axially movable within said core, armatures fixed to said spindle and located at opposite ends of said core, and coils at opposite ends of the core and between the same and said armatures, whereby the axial displacements of said spindle and its armatures vary the inductances of said coils.

3. In a comparator gage, the invention as recited in claim 2, wherein said core is counterbored and said coils are located within the counterbored ends of said core.

4. In a comparator gage, a gage head comprising a shell, a core within said shell having a central bore therethrough and counterbored from its opposite ends, coils within the counterbored ends of said core, a gage spindle extending through the central bore of said core and means supporting the same for axial movement, and armatures mounted on said spindle and adjacent the opposite ends of said core.

5. In a comparator gage, the invention as recited in claim 4, in combination with a sleeve axially movable within said shell and carrying said core.

6. In a comparator gage, the invention as recited in claim 4, in combination with a sleeve axially movable within said shell and carrying said core, and means for adjusting said sleeve axially within said shell of the gage head.

7. In a comparator gage, the invention as recited in claim 4, in combination with a sleeve axially movable within said shell and resiliently supporting said core, and manually operative spring means to impose upon said spindle a pressure that varies with the adjustment of said spring means.

8. In a comparator gage, a gage head, a sleeve within said gage head, a single core of magnetic material removably mounted within said sleeve, said core having an axial bore therethrough, a spindle extending through said bore and carrying a gage tip, coil means mounted on said core at the ends thereof, armatures secured to said spindle and located adjacent the opposite ends of said core, and a pair of flexible diaphragms supporting said spindle from and within said sleeve for axial displacement with respect to said gage head.

9. In a comparator gage, a gage head, a sleeve slidably mounted in said gage head, means for adjusting said sleeve axially of said gage head, a spindle carrying a gage tip, and a pair of flexible diaphragms supporting said spindle from and within said sleeve for axial displacement with respect to said gage head.

10. In a comparator gage, a gage head, a sleeve slidably mounted in said gage head, a spindle carrying a gage tip, resilient means supporting said spindle from and within said sleeve for axial displacement with respect to said gage head, and rotatable threaded means for adjusting said sleeve axially of said gage head.

11. In a comparator gage, the invention as recited in claim 10 wherein said adjusting means comprises a rotatable member with threads of different pitch engaging correspondingly threaded portions of said gage head and said sleeve respectively.

12. In a comparator gage, a gage head, a spindle carrying a gage tip, means comprising a pair of flexible diaphragms supporting said spindle for axial displacement with respect to said gage head, and spring means seated between said supporting means and an end of said spindle, said spring means being manually adjustable to impose a variable pressure upon and axially of said spindle.

FREDERICK KESSLER FLOYD.

REFERENCES CITED

The following references are of record in the file of this patent:

UNITED STATES PATENTS

| Number | Name | Date |
|---|---|---|
| 1,655,386 | Craig | Jan. 3, 1928 |
| 2,013,106 | Nagel | Sept. 3, 1935 |
| 2,240,184 | Hathaway | Apr. 29, 1941 |
| 2,299,997 | Ladrach | Oct. 27, 1942 |
| 2,364,237 | Neff | Dec. 5, 1944 |